(12) United States Patent
Liu et al.

(10) Patent No.: US 6,762,997 B1
(45) Date of Patent: Jul. 13, 2004

(54) METHOD FOR FINDING SHORTEST NETWORK ROUTING PATHS SUBJECT TO SYSTEM CONSTRAINTS

(75) Inventors: Gang Liu, North Plainfield, NJ (US); Kajamalai G. Ramakrishnan, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/537,791

(22) Filed: Mar. 29, 2000

(51) Int. Cl.[7] .............................................. H04L 12/56
(52) U.S. Cl. ...................................... 370/238; 370/400
(58) Field of Search ................................ 370/238, 255, 370/256, 395.32, 351, 389, 400; 709/238, 239, 240, 241, 242

(56) References Cited

U.S. PATENT DOCUMENTS

| | | | | |
|---|---|---|---|---|
| 5,521,910 A | * | 5/1996 | Matthews | 370/256 |
| 5,596,719 A | * | 1/1997 | Ramakrishnan et al. | 709/241 |
| 5,600,638 A | * | 2/1997 | Bertin et al. | 370/351 |
| 5,649,108 A | * | 7/1997 | Spiegel et al. | 709/241 |
| 6,108,702 A | * | 8/2000 | Wood | 709/224 |
| 6,363,319 B1 | * | 3/2002 | Hsu | 701/202 |
| 6,377,551 B1 | * | 4/2002 | Luo et al. | 370/238 |

OTHER PUBLICATIONS

The Network Working Group Request for Comments (RFC) 1058 document Routing Information Protocol, Jun. 1988.*
"A Note on Two Problems in Connexion with Graphs" by E.W. Dijkstra; Numberische Mathematic 1, pp. 269–271 (1959).
"The Traveling–Salesman Problem and Minimum Spanning Trees" by Michael Held and Richard M. Karp; Operations, Research 18, pp. 1139–1162 (1970).
"Network Flows—Theory, Algorithms, and Applications" by Ravindra K. Ahuja, Thomas L. Magnanti and James B. Orlin; Addison–Wesldy Publishing Company, MA; 1998.

* cited by examiner

*Primary Examiner*—Hassan Kizou
*Assistant Examiner*—Christopher M Swickhamer (57) ABSTRACT

A method is disclosed for determining the shortest paths between a source node and a destination node in a network wherein the paths satisfy imposed system constraints. In accordance with the method of the invention, candidate paths are evaluated by accumulating system parameter information from a source node and projecting the system parameter information ahead to the destination node. When the accumulated and projected system parameter information for the candidate path satisfies the imposed system constraints, the candidate path is saved for further evaluation. The candidate paths are sorted in the order such that those paths most-likely to have the shortest lengths and satisfy the imposed system constraint are evaluated first. In one embodiment of the invention, candidate paths that fail to satisfy the imposed system constraints are removed from further processing. Thus, only candidate paths that have at least one complete path that satisfies the imposed system constraints are evaluated further.

24 Claims, 4 Drawing Sheets

METHOD FOR FINDING SHORTEST NETWORK ROUTING PATHS SUBJECT TO SYSTEM CONSTRAINTS

FIELD OF THE INVENTION

This invention relates generally to the field of network communications. More specifically the invention relates to a methodology for determining transmission paths in a multi-path network

BACKGROUND OF THE INVENTION

In the operation of networked systems the expeditious routing of signals or data packets through the network is of significant importance. Typically, the shortest paths between a source and destination node are chosen as best candidates for data transmission. The shortest paths are generally considered the most expeditious and economical paths. Numerous methods and algorithms exist in the prior art to determine those network data links that comprise the shortest path between a source node and a destination node. The method of Dijkstra is the best known of these methods of determining shortest path. See, DIJKSTRA, E. W. "A NOTE ON TWO PROBLEMS IN CONNEXION WITH GRAPHS", NUMBERISCHE MATHEMATIC 1, pp. 269–271 (1959). The method according to Dijkstra determines the shortest path from a source node to a destination node by blindly accumulating network link distances, or lengths, for each path between the source node and the destination node.

Dijkstra and other prior art methodologies determine a shortest path solely on length and these :routing determinations are referred to as unconstrained paths since system parameters that may affect data transmission throughput or delay are not considered. However, when other system parameters that influence data transmission are considered, the shortest path may be neither the most efficient path nor the most expeditious path to send data between a source node and destination node. For example, data paths using older transmission media may be less efficient than a longer data path using newer transmission media. The shorter data path may introduce significant time delays in the data transmission that adversely affect the timely reception of the data. The delay may be introduced, for example, because of buffering time at intermediate nodes, traffic density or data link bandwidth limitations. A longer path with a larger bandwidth may thus be a more efficient path for data transmission, as less delay may be introduced in the transmission.

Time delay in data transmission is extremely important for data transmission in a TCP/IP environment, such as the Internet. In this case, data transmissions occur in data packets that are distributed over a plurality of data paths. These data packets are known to arrive at different times because of different accumulated delays among the transmission paths. For the transmission of textual and static graphical data the different arrival times of such data is usually manifested as a slight delay in displaying the full image and/or text block, and generally constitute only an inconvenience to the user—i.e., there is no ultimate degradation in the received image or text due to such path delays. However, in the field of multi-media, such as video-conferencing or real-time imaging, where audio and visual data are transmitted simultaneously, the arrival of the audio significantly before or after the corresponding visual image destroys the synchronization between the visual image and corresponding audio. Accordingly, for an acceptable quality-of-service (QoS) in multi-media transmission the reception of audio and the associated visual data must occur within a known period. Thus, in transmission of multi-media data, the total delay along paths selected for data transmission must introduce substantially the same amount of delay to achieve an acceptable quality of service.

SUMMARY OF THE INVENTION

The present invention sets forth a methodology that determines data transmission paths between a source node and a destination node to satisfy system constraints imposed on data transmission in the selection of one or more transmission paths. In addition to a system constraint of path length or distance, system parameters, such as link delay and node delay, introduce constraints within the network that affect the selection of the data paths and the QoS of the network. The present invention determines the shortest delay routes or paths between a source and a destination using both distance and other selected system parameters that impose constraints upon the data transmission.

In accordance with the invention, candidate data paths that satisfy known system constraints are determined based on distance and other system parameters. The candidate path characteristics are developed with regard to the imposed constraints using a look-ahead feature that determines the path parameters of a candidate path by projecting the system parameters ahead to the destination node. The projected parameters are used to determine which paths potentially satisfy the imposed constraints. The candidate paths are then iteratively extended node by node through connecting nodes until a transmission path is determined that satisfies the imposed system constraints.

Figure 2:
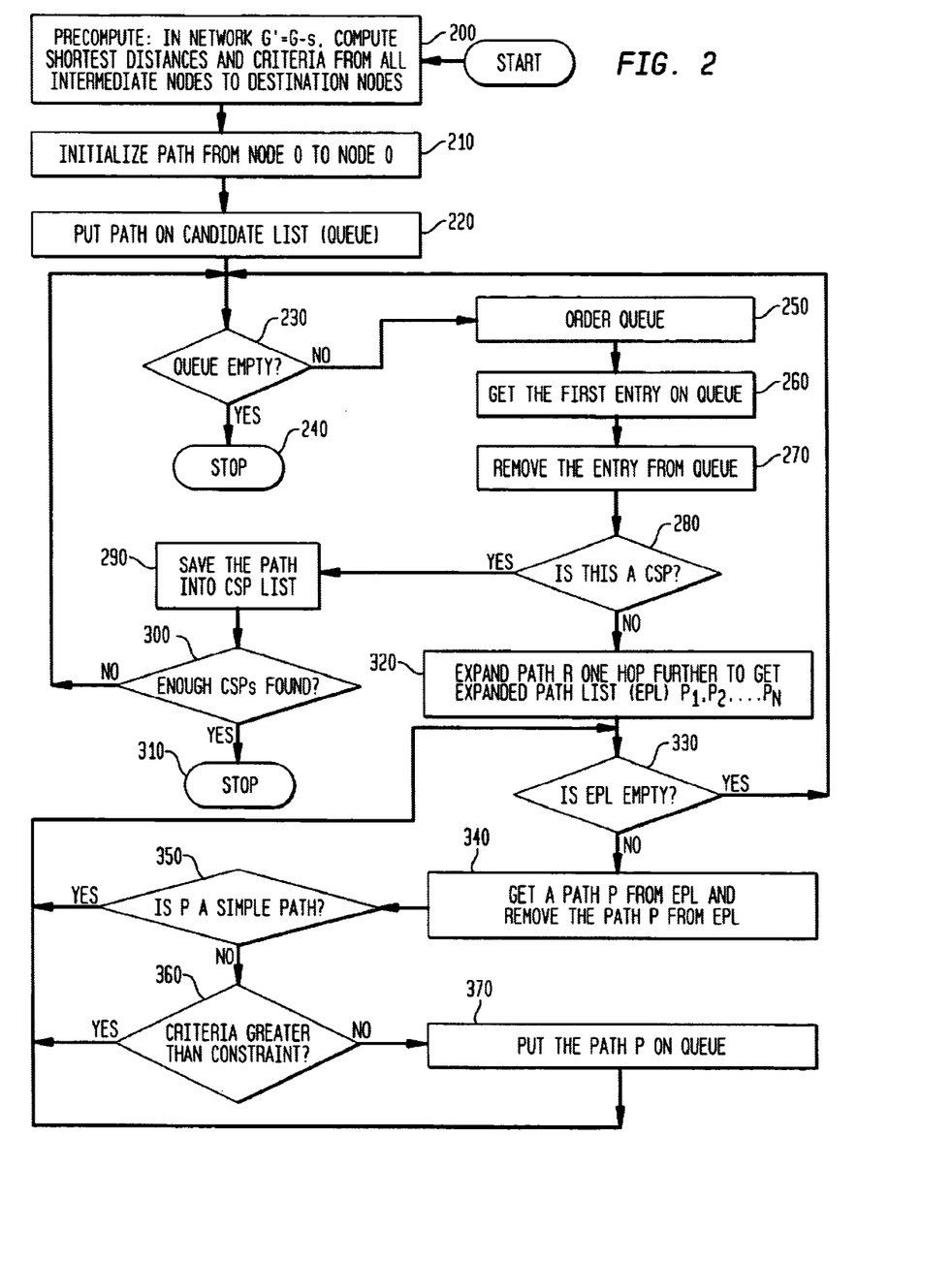
FIG. 2 represents a flow chart of the method steps of the invention.

As illustrated in FIG. 2, processing blocks 230–310 define a loop in which a candidate path list is ordered on path-specific values of a system parameter. A second loop extends each candidate path by one hop. In this loop, defined by blocks 330–370, each extended candidate path is tested to determine if it satisfies the imposed system constraint when the extended candidate path is projected to the destination node. If the extended candidate path satisfies the imposed system constraint, the extended path is placed among the candidate paths on the candidate list.

In one embodiment of the invention, candidate paths are removed from further consideration when the look-ahead feature indicates the projected path parameters of a candidate path exceed the imposed constraints. In this embodiment of the invention only paths that are potentially viable constrained shortest paths are subject to further evaluation.

BRIEF DESCRIPTION OF THE DRAWINGS

The advantages, nature and various additional features of the invention will appear more fully upon consideration of the illustrative embodiments to be described in detail in connection with the accompanying drawings. In the drawings.

It is to be understood that these drawings are for purposes of illustrating the inventive concepts of the present invention.

DETAILED DESCRIPTION OF THE INVENTION

FIGS. 1–4 and the accompanying detailed description contained herein are to be viewed as illustrative examples of the present invention and should not be construed as the only manner of practicing the invention.

Figure 1:
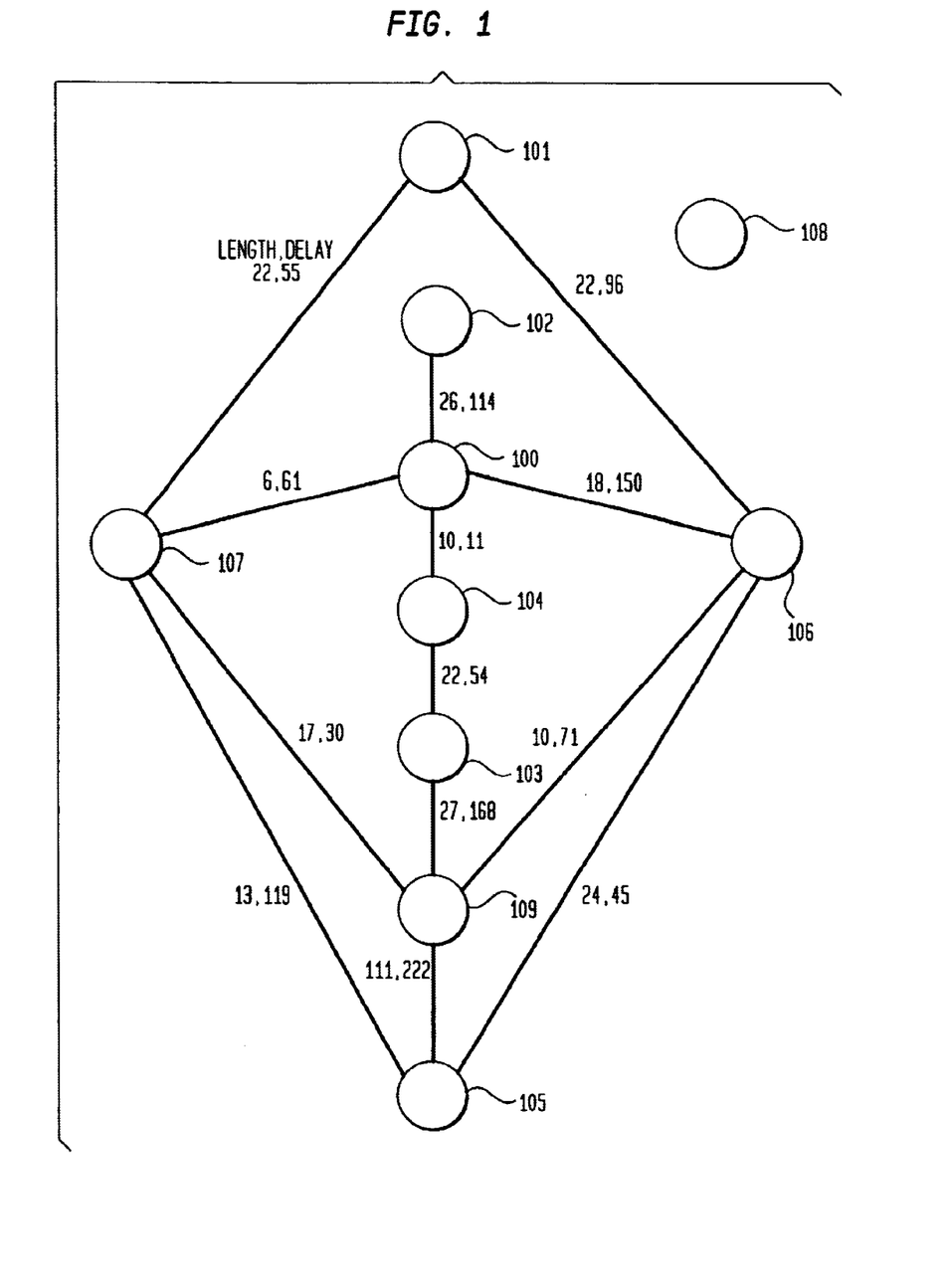
FIG. 1 represents a typical network configuration and is used in illustrating the principles of the invention.

FIG. 1 illustrates a typical network configuration of 10 node elements, labeled 100 through 109. In this exemplary illustration node 100 is the source node and node 109 is the destination node. Node 108 is also a network node; however it is not linked into the network. For each link shown in FIG. 1, are two numbers separated by a slash are shown which represent data link system parameter characteristics between the nodes. For the embodiment illustrated in FIG. 1, the first of the two numbers represents a length or distance between the nodes. The second number represents the value of a system parameter. For example, and as will be used to explain the method steps of the invention, the second system parameter value is a measure of the time delay introduced by the data link or the receiving node element. Hence, the principles of the invention disclosed herein will determine Constrained Shortest Paths based on length and time delay. However, it should be understood that time delay is not the only system parameter that may be operated on by the method of the invention. Other system parameters may also constrain the data transmission and the invention can also be applied to such other parameters. Further, while the illustrative embodiment of the invention is described herein in terms of operation on two system parameters, it should be understood that any number of system parameters may be used in accordance with the methodology of the invention to determine constrained shortest paths.

FIG. 2 illustrates an exemplary embodiment of the method steps of the invention. An initial step of the invention may be a pre-computation of system parameters made at block 200. In this embodiment, the CSP lower bound length and the unconstrained shortest delay from each intermediate node to the destination node are pre-computed for all the network nodes. The CSP lower bound length of a node is defined as any nonnegative number that is no greater than the shortest CSP length from that node to the destination node. As the length of an unconstrained shortest path cannot be greater than any constrained shortest path, then the unconstrained shortest path is a feasible CSP lower bound length and may be used as the CSP lower bound length. In this case, the algorithm proposed by Dijkstra, for example, may be used to compute both the unconstrained shortest length and the CSP lower bound.

At block 210, a first path may be created to begin the processing in accordance with the method of the invention. This first path may be placed on a list of candidate paths at block 220 and may be used to have at least one path available for the methodology of the invention to operate on. A check may be made at block 230 to determine if the list of candidate paths is empty. If the list is empty then at block 240, the algorithm may be halted. Otherwise, at block 250 the list of candidate paths may be ordered. The first entry or path on the candidate list may be selected at block 260 and removed from the candidate list at block 270.

At block 280 a check may be made to determine if the selected candidate path ends at the destination node and is thus a CSP. If the path is a CSP, then at block 290, the path may be saved for assignment at a later time. A check is then made at block 300 to determine if enough CSPs have been found. When enough CSPs have been found the method of the invention may halt at block 310 and the CSPs may be assigned. Otherwise, the method may continue to block 230 and continue as before.

Returning to block 280, if the candidate path is not a CSP, then at block 320, the candidate path may be extended (expanded) to include nodes that are linked to the last node of the candidate path. A check may be made at block 330 to determine if the expanded path list (EPL) is empty. If the expanded path list is empty then the method may continue to block 230 and continue as before. Otherwise, a path on the EPL list may be selected and evaluated and then is removed from EPL at block 340.

As illustrated in the flowchart of FIG. 2, after the initial computation of system parameters, each candidate path is expanded to include a next connected node. The expected system parameters of each of the expanded paths to the destination node are determined by using these pre-computed system parameter values. That is, the expected system parameters for a path are determined by using the accumulated parameter values of the path from source to a current node and the pre-computed system parameters to look-ahead from a current node to the destination node. The expanded paths are then evaluated in the order of satisfying the imposed system constraints. When an expanded path includes the destination node and satisfies the imposed constraint then the expanded path is classified a CSP and saved.

Figure 3:
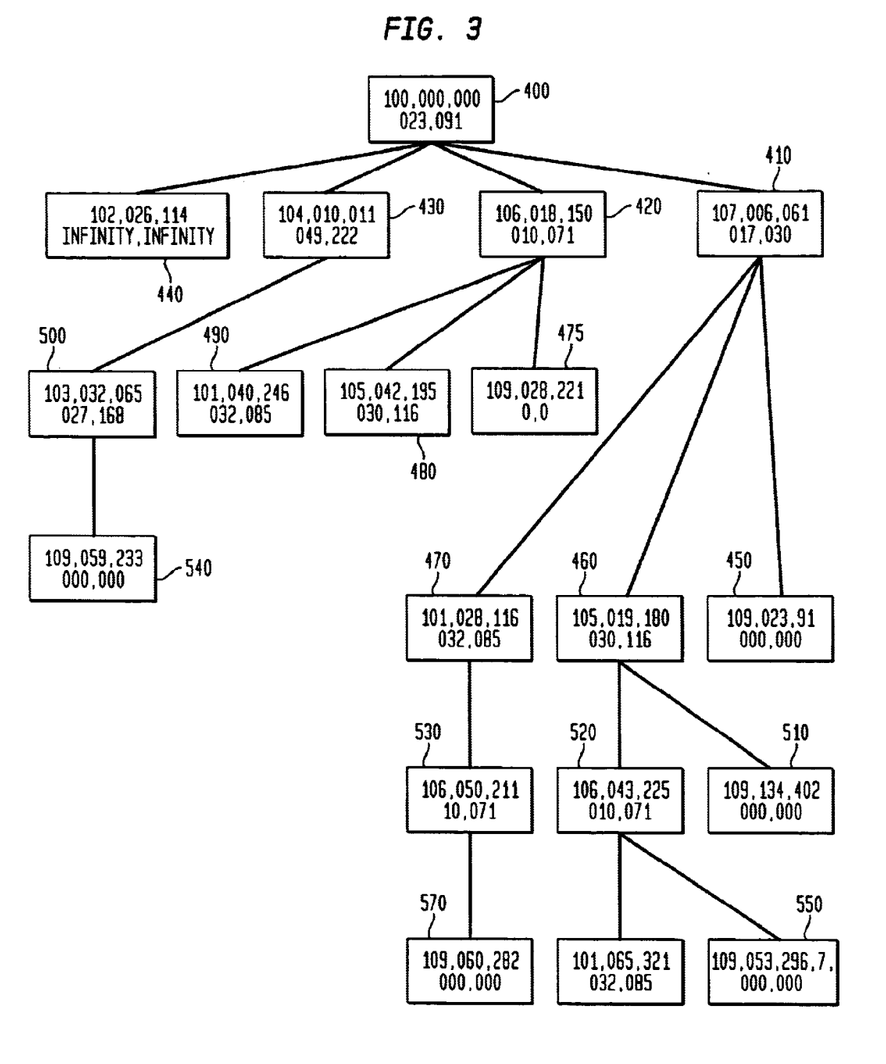
FIG. 3 illustrates a path tree expansion of proposed paths from source node to destination node in accordance with the principles of the invention.

FIG. 3 illustrates an expansion-tree developed in accordance with the method of FIG. 2 that determines constrained paths between nodes 100 and 109 of FIG. 1. Each block in FIG. 3 represents a path from start node 100 to an intermediate node i in the network illustrated in FIG. 1. Each path possesses a set of parameter path identifiers that identify the characteristics of the path. In this exemplary embodiment, five path identifiers are shown sequentially and separated by periods. The first parameter is a node identifier, which for clarity is illustrated as the identification reference label of the node depicted in FIG. 1. The second parameter is the accumulated length of a path from the source node 100 to a current node, i. The third parameter is the accumulated delay of a path from the source node 100 to a current node, i. The fourth parameter is a CSP lower bound length from a current node, i, to the destination node 109. In this illustrated example, the unconstrained shortest path length in the network G-s—i.e., the network G with source node s removed—is used as the CSP lower bound length. The fifth parameter is the smallest delay from a current node, i, to the destination node 109. For example, as shown at block 400 of FIG. 3., the system identifier of node 100 has an accumulated length and delay from the source node of zero units and a projected-ahead (i.e., looking-forward) shortest length and smallest delay of 23 and 91 units, respectively. The shortest length is obtained by projecting ahead to the destination node along path 100-107-109 and the smallest delay is obtained by projecting ahead also along path 100-107-109. As would be understood, network system parameters are independent quantities and, thus, paths with the shortest length and smallest delay need not be the same. This is illustrated at node 105 wherein the shortest length from node 105 to destination node 109 is 30 units,—i.e., along path 105-107-109, while the smallest delay is 116 units,—i.e., along path 105-106-109.

The determination of CSPs for the network shown in FIG. 1 between nodes 100 and 109 may best be illustrated using a detailed example. For the example, the imposed system constraint is selected as 300 delay units—i.e., paths must be selected for data transmission in which the overall transmission delay is less than 300 units of delay. The methodology of FIG. 2 begins at source node 100 and constructs an initial path that is extended to the next adjacent nodes. Thus, four extended paths are created—i.e., 100-102, 100-104, 100-106 and 100-107. The four extended paths are then placed onto the extended path list (EPL). Using the pre-computed accumulated shortest length and smallest delay from source node 100, and the look-ahead feature of shortest length and smallest delay to the destination node, as shown in FIG. 3, the viability of each of the extended paths as a CSP may now be evaluated.

Initially selecting path 100-107 for evaluation, a check is made at block 350 to determine if the path 100-107 is a simple path. As path 100-107 is simple path, a check is made, at block 360, to determine if there is at least one path between the source node and destination node that includes path 100-107 and satisfies the imposed system parameter constraints. For this selected extended path, the accumulated delay from the start node 100 is 61 units and the smallest delay from node 107 to the destination node 109 is 30 units, as shown at block 410 in FIG. 3. Here, the total delay is less than the imposed constraint and, accordingly, there is at least one path from source to destination node that satisfies the imposed system constraint that includes extended path 100-107. Path 100-107 is thus a viable candidate path and is placed on the list of candidate paths at block 370.

Selecting the next path on the EPL, path 100-106, the total expected delay from source node 100 to destination node 109 is determined to be 221 units (i.e., an accumulated delay from the source node of 150 units plus the projected smallest delay to the destination node of 71 units as shown in block 420 of FIG. 3). The total delay for at least one path from source node to the destination node, via node 106, is less than the imposed system parameter constraint. Path 100-106 remains a viable candidate path. Path 100-106 is placed on the list of candidate paths for further evaluation at block 370.

Selecting path 100-104 as the next extended path for evaluation, the total expected delay between source node 100 and destination node 109 is 233 units—i.e., 11+222, as shown in block 430 in FIG. 3). Thus, there is at least one path between source node 100 and destination node 109 that includes path 100-104 that satisfies the imposed system constraint. Path 100-104 remains a viable candidate path and is placed on the list of candidate paths at block 370.

With regard to path 100-102, node 102 has no connection to destination node 109 in network G-s, as is shown in FIG. 1. There is no simple path between the source node and destination node that includes path 100-102. Hence, path 100-102 is not a viable path. In this case, the length and delay from node 102 to node 109 are undefined as shown in block 440 of FIG. 3. This undefined condition may be indicated by specifying the projected system parameters as being of infinitely long length and delay. For the embodiment under consideration here—in which, only candidate paths that have at least one path that satisfies the imposed system constraints are saved for further evaluation—path 100-102 is not placed on the list of candidate paths as the projected system parameters are known to exceed the imposed system constraints. However, for another embodiment of the invention, the path 100-102 may be placed on the candidate path list. With such an embodiment, in which all possible candidate pairs are listed, the infinitely long length and delay causes paths such as 100-120 to be positioned in lower order than other viable paths that are on the candidate list.

After the extended paths of the initial path have been evaluated, the list of candidate paths is re-ordered by the expected-length system parameter. Those candidate paths that have the shortest length and satisfy the imposed system parameters are evaluated first. For the illustrated embodiment disclosed herein a "heap-sort" algorithm is disclosed. Such "heap-sort" algorithms are well known in the art and need not be discussed in detail herein Numerous other sorting algorithms may also be used to order the candidate list—e.g., bubble-sort, merge-sort, select and sort, quick-sort.

The candidate list is ordered at block 250 as follows:

| Order | 1 | 2 | 3 |
| --- | --- | --- | --- |
| Candidate path list | 100-107 | 100-106 | 100-104 |
| $L_{sm} + RL_{md}$ = Expected length | 6 + 17 = 23 | 18 + 10 = 28 | 10 + 49 = 59 |
| $D_{sm} + RL_{md}$ = Expected delay | 61 + 30 = 91 | 150 + 71 = 221 | 11 + 222 = 233 |

Selecting path 100-107 as a candidate path for further evaluation, a check is made to determine if a CSP has been found. Node 107 is not a destination node; hence, the selected path does not end at the destination and a CSP has not been found. Path 100-107 is next extended to the next adjacent nodes (i.e., nodes 109, 105, 101) at block 320. In this case, it may be determined that the extended paths 100-107-101, 100-107-105, 100-107-109 are all simple paths and have expected lengths and delays to the destination node 109 of 60, 201; 39, 296; and 23, 91 units, respectively (see blocks 470, 460, and 450 of FIG. 3, respectively). Accordingly, there is at least one path for each of these extended paths that satisfy the imposed system parameter constraints. Thus, each of the extended paths remains as a viable path and is placed on the list of candidate paths at block 370. After the extended paths depending from path 100-107 are evaluated and placed on the candidate list at block 370, the list of candidate paths is again ordered in increasing order of the expected-lengths as follows:

| Order | 1 | 2 | 3 | 4 | 5 |
| --- | --- | --- | --- | --- | --- |
| Candidate Paths List | 100-107-109 | 100-106 | 100-107-105 | 100-104 | 100-107-101 |
| $L_{sm} + LR_{md}$ = Expected length | 23 + 0 = 23 | 18 + 10 = 28 | 19 + 30 = 49 | 10 + 49 = 59 | 28 + 32 = 60 |
| $D_{sm} + DR_{md}$ = Expected delay | 91 + 0 = 91 | 150 + 71 = 221 | 180 + 116 = 296 | 11 + 222 = 233 | 116 + 85 = 201 |

Selecting path 100-107-109 at block 260, a check is made, at block 280, to determine whether a CSP has been found. In this case, the selected candidate path ends at the destination node and the accumulated system parameters to destination node 109 satisfy the imposed system constraints. Thus, path 100-107-109 is a CSP and is saved at block 290. No further processing is necessary on this path.

The next entry from the list of candidate paths—i.e., path 100-106, is then selected for evaluation in accordance with the method steps of the invention. Path 100-106 is determined not to be a CSP, at block 280, and is thus extended to the next adjacent nodes, to form extended paths 100-106-109, 100-106-105, and 100-106-101. Using the look-ahead feature of the invention, the smallest delay to destination node 109 continuing from the last node of each extended path is determined to be 0, 116 and 85 units, respectively (see blocks 475, 480, and 490 of FIG. 3, respectively). The overall expected delay between source node 100 and destination node 109 for these candidate paths is 221, 311 and 331, respectively. Path 100-106-109 remains a viable path as at least one path between source node 100 and destination node 109 has an expected delay that satisfies the imposed system constraint. Path 100-106-109 is placed on the list of candidate paths at block 370. Paths 100-106-105 and 100-106-101, however, have expected delays greater than the imposed system constraints. Thus, there is no path between the source node 100 and destination node 109 that satisfies the imposed system constraint that includes either of these two paths. In the embodiment disclosed herein, paths 100-106-105 and 100-106-101 are not placed on the candidate path list. These paths are "pruned" from the path tree.

After the extended paths of candidate path 100-106 have been evaluated, the candidate path list is again ordered at block 250 as follows:

| Order | 1 | 2 | 3 | 4 |
|---|---|---|---|---|
| Candidate Path List | 100-106-109 | 100-107-105 | 100-104, | 100-107-101 |
| Expected Length | 28, | 39 | 59 | 60 |
| Expected Delay | 221 | 296 | 233 | 201 |

Selecting candidate path 100-106-109 at block 260, a check is made, at block 280, to determine if a CSP has been found. In this case, the selected path ends at destination node 109 and the delay from source node to destination node is less than the imposed system constraint. Therefore a CSP has been found and path 100-106-109 is saved at block 290.

Path 100-107-105 is next selected for extension at block 260. Path 100-107-105 is determined not to end at the destination node and is extended to the next adjacent node—i.e., nodes 106, 109. The expected delays of extended paths 100-107-105-106 and 100-107-105-109 are then checked to determine if they satisfy the imposed system constraint. In this case, the expected delays of the two paths are 296 and 402 units, respectively (as shown in blocks 520 and 510 of FIG. 3, respectively). Therefore, path 100-107-105-106 remains a viable path and is placed on the list of candidate paths at block 370. Path 100-107-105-109, although ending at the destination node, has an expected delay of 402 units and is pruned from the path tree.

After the extended paths of candidate path 100-107-105 have been evaluated, the list of candidate paths is again ordered at block 250 as follows:

| Order | 1 | 2 | 3 |
|---|---|---|---|
| Candidate Path List | 100-107-105-106 | 100-104 | 100-107-101 |
| Expected Length | 53 | 59 | 60 |
| Expected Delay | 296 | 233 | 201 |

As should be understood, in accordance with the method steps of the invention, paths 100-107-105-106-109 (see blocks 400, 410, 460, 520 and 530 of FIG. 3), 100-104-103-109 see blocks 400, 430, 500 and 540 of FIG. 3) and 100-107-101-106-109 (see blocks 400, 410, 470, 530 and 570 of FIG. 3) may be determined to be paths that satisfy the imposed system constraints. Thus, a further detailed discussion of the application of the method steps of the invention to determine these paths is not warranted.

In another embodiment, the extended path list may also be ordered before evaluating the extended paths. That ordering, which will be apparent to those skilled in the art, enables the shortest extended paths to be evaluated first.

In accordance with the principles of the invention, as disclosed herein, those candidate paths whose projected system parameters, to the destination node, exceed the imposed system constraints are not added to the candidate path list. By failing to include such non-viable paths in the list of candidate paths, the number of paths that require evaluation is reduced to those paths that contain at least one path that satisfies the imposed system constraint.

In another embodiment all candidate paths are included on the list of candidate paths for processing, as described above. In this embodiment the length of the candidate path list increases to include all paths from source to destination nodes and non-viable paths gravitate toward the bottom end of the candidate list. This embodiment is advantageous when the number CSPs required is not satisfied and backup paths need be selected even though the imposed system constraint is violated.

As would be understood, the imposed system constraint may be extended to include other system parameters. In such cases, the ordering algorithm accommodates the additional system parameters such that the paths most likely to satisfy the imposed system constraints are evaluated first.

The principle of the invention is ideally suited to be included in a processing unit, such as a computer, in each node of a network. A node, when acting as a source node, may then determine a number of CSPs, in accordance with the principle of the invention, that satisfy known system constraints on data transmission. In one embodiment, the processing unit of the source node may retain system parameters, such as length and time delay between node elements, and use this information in accordance with the method disclosed to determine CSPs. For the example illustrated, source node 100 may retain the accumulated lengths and delays to all intermediate nodes and the projected lengths and delays from all intermediate nodes to the destination node. Source node 100 may then determine CSPs by projecting ahead using the retained system parameters to determine those paths that satisfy the imposed constraints.

In another embodiment, systems parameters that are retained at a node may be dynamically updated by measurements taken at intermediate nodes. Because of increased data traffic occurring on the link, time delay values, for example, may also increase. This increase in delay may significantly alter the delay of the path from source node to destination node. In this case, an intermediate node may report the increase in link delay time to the source node. The source node retains this dynamically updated system parameter information that is used to determine CSPs. In this embodiment the choice of CSPs may change as data traffic changes are occurring in the network.

Figure 4:
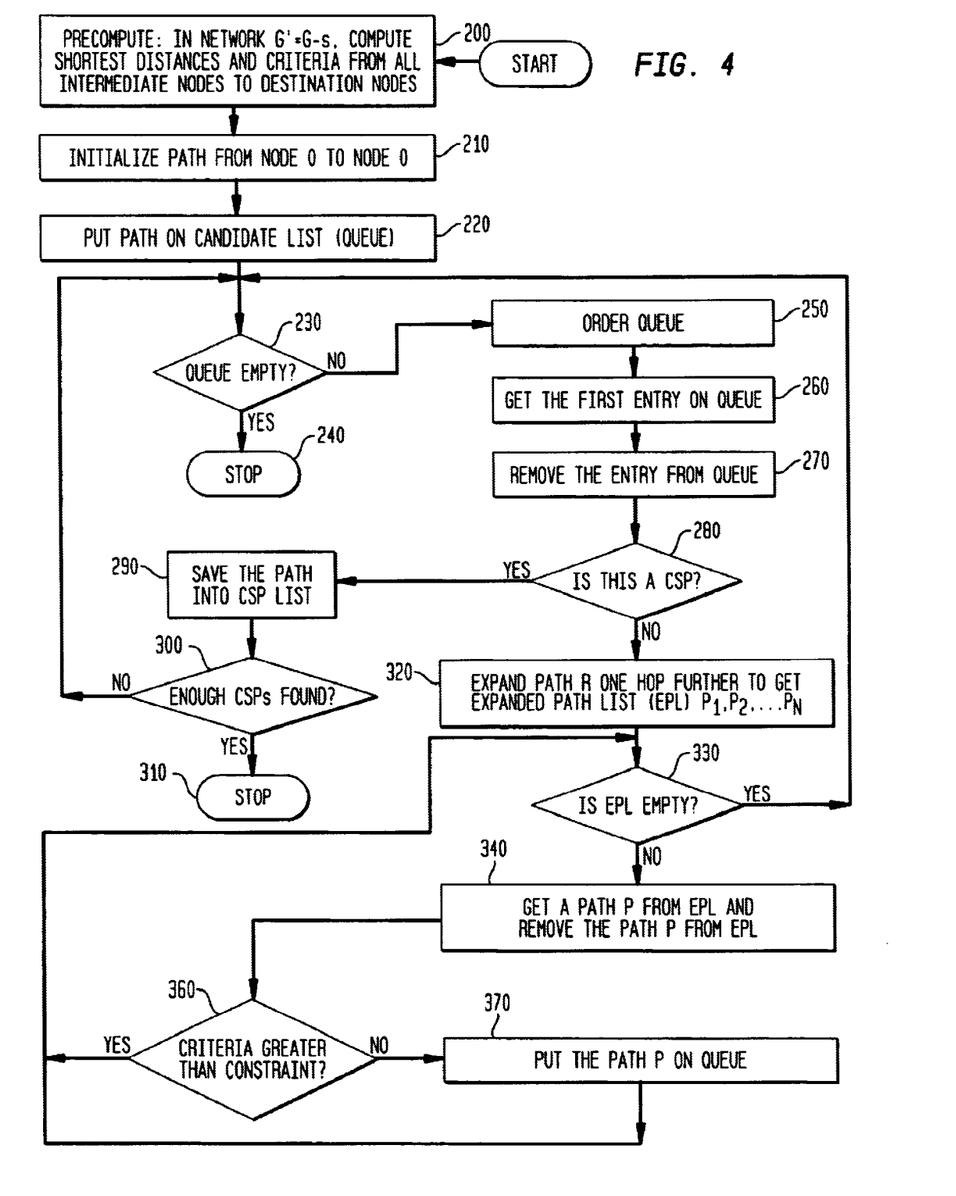
FIG. 4 illustrates a flow chart of a second embodiment of the method steps of the invention.

FIG. 4 illustrates the method of the invention wherein CSPs are determined using complex paths. Complex paths, as is understood in the art, are network paths that contain loops. That is, the network path may pass through the same node more than one time. As would be understood by those skilled in the art, the method steps illustrated in FIG. 4 are similar to those steps presented herein and illustrated in FIG. 2. Hence, a detailed discussion of the method steps of FIG. 4 need not be discussed in detail herein.

Mathematical Formulation of the Constrained Shortest Path Problem

The Constraint Shortest Path (CSP) problem can be stated as finding the paths with the shortest sum of lengths subject to each constraint k wherein the sum of the constraint is less than a given limitation, $C^k$. A CSP is that path from source node to destination node that satisfies the imposed system constraint.

Consider a network $G=(N, A)$, where N is the set of nodes and A is the set of arcs (data links). Each arc $a_{ij}$ in A is associated with a nonnegative length $l_{ij}$ and a number of nonnegative constraint metrics $C_{ij}^k$, where $k \in (1, 2, \ldots, K)$, and K is the number constraints given for the problem. The CSP problem may be formulated as:

$$\text{minimize } L = \sum_{a_{ij} \in A} l_{ij} x_{ij} \qquad \text{Equation [1]}$$

subject to:

$$\sum_{a_{ij} \in A} c_{ij}^k x_{ij} \leq C^k; \quad k = 1, 2, \ldots, K$$

$$\sum_{(i: a_{ij} \in A)} x_{ij} - \sum_{(i: a_{ji} \in A)} x_{ji} = \begin{cases} 1 & \text{if } i = s \\ -1 & \text{if } i = d \\ 0 & \text{else} \end{cases}$$

$$x_{ij} = \begin{cases} 1 & \text{if } x_{ij} \in CSP \\ 0 & \text{else} \end{cases}$$

The CSP lower bound length may also be formulated using other algorithms. For example, another method of determining a CSP lower bound length is by using a Lagrangian Relaxation method to provide a bound on the problem of Equation 1. The Lagrangian Relaxation method is well known in the art, and need not be discussed in detail herein. For example, See, M. Held and R. M. Karp, "THE TRAVELLING-SALESMAN PROBLEM AND MINIMUM SPANNING TREES", Operations. Research 18, 1138–1162. (1970) and S. Ahuja and J. Orlin, "NETWORK FLOWS," Addison-Wesley Publishing Company, Ma. 1998.

Applying the relaxation to the problem specified by Equation 1, a CSP lower bound problem may be formulated as:

$$\text{minimize } R = \sum_{a_{ij} \in A} (l_{ij} - \lambda c_{ij}) x_{ij} + \lambda (C - C_{sm}) \qquad \text{Equation 2}$$

subject to:

$$\sum_{a_{ij} \in A} c_{ij} x_{ij} \leq C - C_{sm}; \quad \text{Relaxed}$$

$$\lambda \geq 0;$$

$$\sum_{(i: a_{ij} \in A)} x_{ij} - \sum_{(i: a_{ji} \in A)} x_{ji} = \begin{cases} 1 & \text{if } i = m \\ -1 & \text{if } i = d \\ 0 & \text{else} \end{cases}$$

$$x_{ij} = \begin{cases} 1 & \text{if } x_{ij} \in CSP \\ 0 & \text{else} \end{cases}$$

where A is a path from an intermediate node m to destination node d; and, $C_{sm}$ is the accumulated delay from the source node, s, to the intermediate node m.

Equation 2 is equivalent to a shortest path problem of Equation 1 when the term $(l_{ij} - \lambda c_{ij})$ is treated as an equivalent length of link (i, j). For example, in a network $G_\lambda = (N, E)$, each link is associated with a length $(l_{ij} - \lambda c_{ij})$, and the shortest path length from an intermediate node m to the destination node may be determined as $L_\lambda$ using the algorithm proposed by Dijkstra when the source node is removed from consideration. The solution of Equation 2 may then be determined as $(L_\lambda + \lambda C - \lambda C_{sm})$. Thus, the shortest length from node m to node d with the criteria constrained by $(C - C_{sm})$ cannot be less than $(L_\lambda + \lambda C - \lambda C_{sm})$. Thus, $(L_\lambda + \lambda C - \lambda C_{sm})$ may be used as a CSP lower bound length.

The examples given herein are presented to enable those skilled in the art to more clearly understand and practice the instant invention. The examples should not be considered as limitations upon the scope of the invention, but as merely being illustrative and representative of the use of the invention. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims is reserved.

What is claimed is:

1. In a network having a plurality of network nodes and connecting links wherein system parameters are associated with each node and each link, a method to determine a set of network paths between a source node, S, and a destination node, D, subject to an imposed constraint on at least one system parameter, said method comprising the steps of:
   a. selecting a path from a list of at least one candidate path, said selected path having an accumulated measure of said at least one system parameter from said source node, S, to an end node;
   b. extending said selected path from said end node to each of one or more next nodes, N, connected to said end node, thereby defining one or more extended paths, each of said extended paths ending on one of said next connected nodes N;

c. determining a projected measure of said at least one system parameter for said each of said extended paths by projecting ahead from each one of said next connected nodes, N, to said destination node, D, and saving said each of said extended paths in said list of at least one candidate path;

d. ordering said list of at least one candidate path by respective values of said at least one system parameter; and e. from said ordered list of at least one candidate path, selecting at least one S-to-N path that satisfies said imposed system parameter constraint.

2. The method as recited in claim 1 further comprising the step of repeating steps (a) through (e) for each path in said list of at least one candidate path.

3. The method as recited in claim 1 further comprising the step of repeating steps (a) through (e) until a known number of S-to D paths that satisfy system parameter constraints is achieved.

4. The method as recited in claim 1 wherein said system parameter includes a length between said nodes.

5. The method as recited in claim 4 wherein said accumulated measure of system parameter includes a shortest length from said source node.

6. The method as recited in claim 5 wherein said projected measure of system parameter includes a shortest length to said destination node.

7. The method as recited in claim 1 wherein said projected measure of system parameter includes a lower bound of a constrained shortest path to said destination node.

8. The method as recited in claim 7 herein said lower bound is a shortest length to said destination node.

9. The method as recited in claim 7 wherein said lower bound is determined using a Lagrangian relaxation method.

10. The method as recited in claim 1 wherein said system parameter includes delay between said nodes.

11. The method as recited in claim 10 wherein said accumulated measure of system parameter includes a smallest delay from said source node.

12. The method as recited in claim 10 wherein said projected measure of system parameter includes a smallest delay to said destination node.

13. The method as recited in claim 1 wherein said at least one system parameter constraint is a known value of delay.

14. The method as recited in claim 1 wherein said at least one system parameter constraint is a known value of length.

15. The method as recited in claim 1 wherein the step of ordering is performed using an algorithm selected from the group heap-sort, bubble-sort, hashing and selected sort.

16. The method as recited in claim 15 wherein said at least one system parameter used in sorting includes time delay.

17. The method as recited in claim 15 wherein said at least one of said system parameter used in sorting includes length.

18. The method as recited in claim 1 further comprising ordering said extended paths using at least one of said system parameters as a sorting criterion.

19. The method as recited in claim 18 wherein said at least one system parameter used in sorting includes time delay.

20. The method as recited in claim 18 wherein said at least one of said system parameter used in sorting includes length.

21. A network having a plurality of node elements, an apparatus to determine the shortest path from a source node, S, to a destination node, D, subject to an imposed constraint on a system parameter comprising:

a processing unit operative to:

determine an expected value for said system parameter from said source node, S, to each of next node elements, N;

formulate candidate paths from said source node to each of said next node elements and project ahead therefrom to said destination node to determine a projection of said system parameter for each of said candidate paths;

compare said projections to said imposed constraint;

order said candidate paths to evaluate said candidate paths in accordance with said system parameter; and select a candidate path that satisfies said imposed constraint.

22. The apparatus as recited in claim 21 further operative to discard said candidate paths having one of said projections that fails to satisfy said imposed constraint.

23. The apparatus as recited in claim 21 further operative to update said system parameter.

24. The apparatus as recited in claim 23 wherein said updated system parameter is provided by an intermediate node.

* * * * *